US011896990B2

(12) United States Patent
Duffin et al.

(10) Patent No.: US 11,896,990 B2
(45) Date of Patent: Feb. 13, 2024

(54) NOZZLE ASSEMBLY WITH ROTATING NOZZLE INSERT

(71) Applicant: XCAD VALVE AND IRRIGATION, INC, Paul, ID (US)

(72) Inventors: Don Duffin, Paul, ID (US); Roger Duffin, Paul, ID (US); Casey Nutt, Paul, ID (US)

(73) Assignee: XCAD VALVE AND IRRIGATION, INC, Paul, ID (US)

(*) Notice: Subject to any disclaimer, the term of this patent is extended or adjusted under 35 U.S.C. 154(b) by 347 days.

(21) Appl. No.: 17/362,814

(22) Filed: Jun. 29, 2021

(65) Prior Publication Data

US 2022/0097085 A1 Mar. 31, 2022

Related U.S. Application Data

(63) Continuation-in-part of application No. 17/024,190, filed on Sep. 17, 2020, now Pat. No. 11,045,824.

(51) Int. Cl.
*B05B 3/00* (2006.01)
*B05B 15/65* (2018.01)
*B05B 15/55* (2018.01)

(52) U.S. Cl.
CPC .............. *B05B 3/008* (2013.01); *B05B 15/65* (2018.02); *B05B 15/55* (2018.02)

(58) Field of Classification Search
CPC ..... B05B 3/063; B05B 3/0486; B05B 3/0463; B05B 3/008; B05B 15/65
USPC ......... 239/104, 119, 222.11, 222.17, 222.21, 239/223, 224, 581.1
See application file for complete search history.

(56) References Cited

U.S. PATENT DOCUMENTS 6,199,771 B1 * 3/2001 Clearman ............. B05B 3/0445 239/222.11
6,254,013 B1 * 7/2001 Clearman ............. B05B 1/3006 239/222.17
6,382,525 B1 * 5/2002 Santiesteban ........... B05B 1/265 239/222.11

(Continued)

*Primary Examiner* — Steven J Ganey
(74) *Attorney, Agent, or Firm* — Scott Swanson; Shaver & Swanson

(57) ABSTRACT

An improved nozzle assembly for use with a sprinkler body. The nozzle assembly has a nozzle body having a nozzle insert bore and defining a fluid flow path through the nozzle assembly. A nozzle insert is positioned in the nozzle body and retained within the nozzle assembly. The nozzle insert is rotatable between operating positions. In some embodiments, a spring biased detent and detent notches index the nozzle insert at one of a series of operating positions. The nozzle insert is rotatable between the series of operational positions including the IN (or insertion) position, the RUN position, the OFF position, the FLUSH position, and the LINE FLUSH position. In an alternate embodiments the nozzle insert has detents on a circumference of the nozzle insert. A magnet is positioned in or attached to the nozzle insert. A second magnet is positioned in or attached to the body of the nozzle assembly. The detents are configured to align with detent notches in a faceplate of the nozzle assembly body. When the detents are aligned with the detent notches, the attractive force between the two magnets retains the nozzle insert in one of the operating positions in the nozzle insert bore.

20 Claims, 18 Drawing Sheets

(56) References Cited

U.S. PATENT DOCUMENTS

| | | | | |
|---|---|---|---|---|
| 7,677,475 | B2 * | 3/2010 | Lawyer | B05B 1/265<br>239/222.11 |
| 8,028,932 | B2 * | 10/2011 | Sesser | B05B 3/008<br>239/222.21 |
| 9,534,619 | B2 * | 1/2017 | Sesser | B05B 15/534 |

* cited by examiner

NOZZLE ASSEMBLY WITH ROTATING NOZZLE INSERT

PRIORITY/CROSS-REFERENCE TO RELATED APPLICATIONS

This application claims the benefit of U.S. Nonprovisional application Ser. No. 17/024,190, filed Sep. 17, 2020 the disclosure of which is incorporated by reference.

TECHNICAL FIELD

The presently disclosed technology relates to a nozzle and nozzle body for use with an irrigation sprinkler. More particularly, the present invention is a nozzle body having a removable nozzle insert configured to rotate to a plurality of operating positions within the nozzle body.

BACKGROUND

Agricultural irrigation systems typically utilize a main distribution line, such as a center pivot, that leads to a series of individual distribution lines that utilize one or more sprinklers. A variety of sprinklers exist that serve to distribute the irrigation water in a variety of ways, with a common mechanism being to spray fluid from a nozzle or nozzle-like structure onto a distribution plate or disc. Irrigation water delivered by these systems is often delivered by canal or taken directly from a natural source. The irrigation water can have dirt or other debris in the material that can lead to clogging of the sprinkler nozzles and/or valves leading to the sprinklers. Accordingly what is needed is an improved nozzle and/or sprinkler that allows for flushing of the nozzle, facilitates simple replacement of the nozzle with varying nozzle sizes, and provides for flushing of the line above the nozzle without requiring detachment of the sprinkler from the irrigation line.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a nozzle assembly having a side loading nozzle. The nozzle assembly has a nozzle body. The nozzle body can be integrally attached to a sprinkler mechanism or releasably attached. The nozzle body having a flow passage along a longitudinal flow axis of said the body from a fluid input at a first end of the nozzle body to a fluid output at a second end of the nozzle body. The nozzle body having a face and defining a nozzle body bore formed in the nozzle body. The nozzle body bore extending from the face through the nozzle body and intersecting the flow passage in a generally perpendicular orientation to the flow passage. The nozzle body bore defined by a substantially cylindrical wall within the nozzle body.

A nozzle insert is removably positioned within the bore in the nozzle body. The nozzle insert having an elongated insert body having an insert axis about the nozzle insert rotates within the nozzle body. The nozzle insert is rotatable to plural operating positions. The nozzle insert having a forward end face comprising a turning knob. The nozzle bore extends through the insert body on an axis intersecting said insert axis. The nozzle bore having a first end and a second end and configured to restrict fluid flow therethrough from said first end to said second end. The nozzle bore is configured to align with said flow passage of said nozzle body to provide a continuous fluid passage. The nozzle insert having a radial ring proximate to the first face of the nozzle insert. The radial ring comprising a series of detent notches radially positioned in the radial ring.

The nozzle assembly has a detent. The detent is biased to index rotation of the nozzle insert at each of the detent notches. The detent is configured to allow rotation of the nozzle insert between detent notches by hand. Each of the detent notches corresponds to an operating position, thus rotation of the nozzle insert to each detent positions the nozzle insert in different operating positions.

In one embodiment the nozzle assembly comprises a lever. The lever has a first end and a second end. The lever is pivotally attached to the nozzle assembly. The first end of the lever is formed as the detent. The second end of the lever is configured such that depression of the second end of the lever releases the detent from one of the detent notches, allowing rotation of the nozzle insert. Preferably a spring biases the lever into detent with one of the detent notches. Preferably the spring is a torsion spring. Preferably the lever is pivotally attached to the face of the nozzle body at a point on the lever between the first end and second end. In this embodiment a stop tab can be positioned or formed in the nozzle body, such as in or on the face of the nozzle body, so as to prevent over rotation of the lever. The stop tab preferably stops the second end of the lever from rotating beyond the stop tab. Full depression of the lever allows insertion and removal of the nozzle insert.

In another embodiment, the face of the nozzle body has a detent plate assembly. The detent plate assembly is configured to arrest rotation of the nozzle insert. The nozzle insert is positioned through the detent plate assembly into the nozzle bore. The detent plate assembly has a detent plate housing a detent plate. The detent plate is slidably configured in the detent plate housing. The detent plate preferably forms the detent that indexes the nozzle insert by inserting into one of the detent notches. Preferably the detent plate is configured such that a detent formed on the plate is biased into the detent notches when the nozzle insert is aligned such that a detent notch is aligned with the detent. Preferably a spring is positioned in the detent plate assembly to bias the detent plate to index the nozzle insert. Preferably the detent plate assembly is configured such that an edge of the detent plate is depressed by a user to remove the detent on the nozzle insert. In this embodiment the detent plate is provided with a push surface that is configured for depression by a user's fingers or thumb.

The nozzle assembly can include a nozzle carrier mount. A nozzle carrier is configured for attaching to the nozzle carrier mount. The nozzle carrier is for carrying nozzles not positioned within the nozzle bore, such as extra nozzles, replacement nozzles, and/or other nozzles accompanying the nozzle assembly. Preferably the nozzle carrier includes a cylinder configured for receiving the nozzle insert. The nozzle carrier preferably has a clip configured to releasably engage the circumferential ring of each nozzle insert to retain the nozzle inert in the cylinder of the nozzle carrier.

Preferably the nozzle insert comprises a stop depression. The stop depression is configured to align with the flow channel to prevent flow through the nozzle body from the nozzle body inflow.

The nozzle assembly can comprise a weight. The weight provides stability to the nozzle assembly when hanging from a fluid delivery pipe or structure.

The nozzle body preferably has a seal carrier and a nozzle seal. The seal carrier retains the nozzle seal in the nozzle body fluid passage between the nozzle body and the nozzle insert. The nozzle seal preferably has a concave shape. The nozzle seal preferably has at least one positioning tab. The positioning tab(s) is positioned within a locating groove of the nozzle body to locate the nozzle seal in a correct position when the nozzle seal is positioned within the nozzle body.

Further disclosed is another embodiment of a nozzle assembly having a side loading nozzle. This embodiment includes a nozzle body. The nozzle body having a flow passage along a longitudinal flow axis of the nozzle body from a fluid input at a first end of the nozzle body to a fluid output at a second end of the nozzle body. The nozzle body comprising a face and defining a nozzle body bore formed in the nozzle body extending from the face through the nozzle body and intersecting the flow passage in a generally perpendicular orientation to the flow passage. The nozzle body bore defined by a substantially cylindrical wall within the nozzle body. The face having a plurality of detent depressions positioned around the bore.

In this embodiment the nozzle insert has a plurality of detents, preferably the same number of detents as detent notches in the face, extending from the circumference of said nozzle insert. The nozzle body has a nozzle body magnet. The nozzle insert has a nozzle insert magnet. The nozzle body magnet and nozzle insert magnet are configured for attractive force between the two. The nozzle body magnet is fixed in the nozzle body such that the attractive force between the magnets is configured to bias the detents into the detent notches and index the nozzle insert in each of the operating positions. The detent depressions can have sloped surfaces for allowing sliding movement of the detents into and out of the detent notches when the nozzle insert is rotated between operating positions.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

Figure 1:
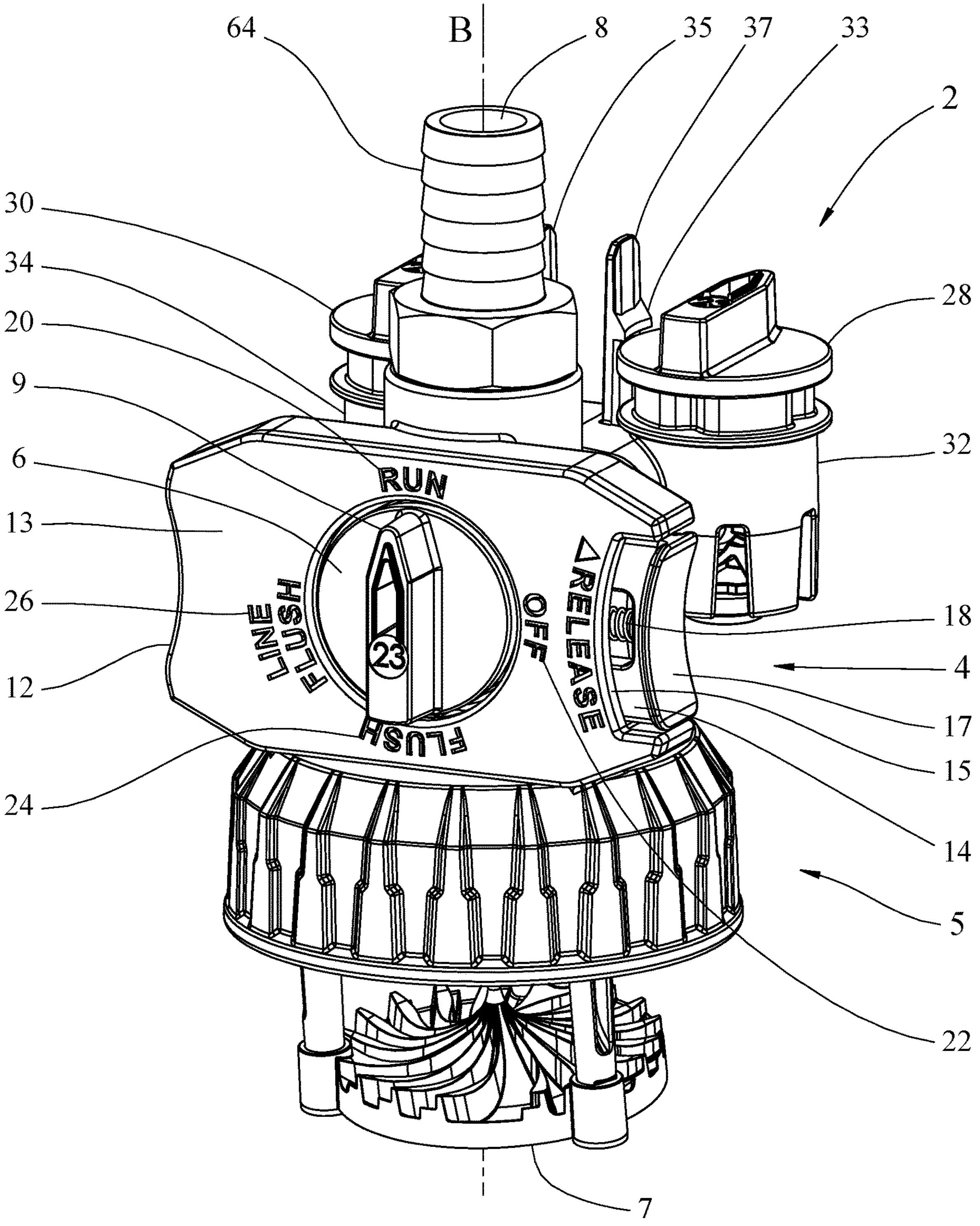
FIG. 1 illustrates a perspective view of a first embodiment of a nozzle assembly.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIGS. 1-8 illustrate a first embodiment of a nozzle assembly and a nozzle carrier. FIG. 1 illustrates a perspective view of the nozzle assembly and nozzle carrier. The nozzle assembly 2 has a nozzle assembly body 4. The nozzle assembly is configured for connection to a fluid distributor 5 or sprinkler. The depicted fluid distributor 5 is configured to distribute fluid sprayed onto a distribution disc 7, although a variety of fluid distribution sprinklers can be utilized. The nozzle assembly has a fluid input 8 for receiving fluid, such as irrigation water, to be distributed. In the depicted embodiment the nozzle assembly has an adapter 64 for attaching to a fluid delivery line. Fluid enters the adapter and flows through a fluid delivery tube along flow path B to a nozzle formed with a nozzle bore 11 (shown in FIG. 4). The nozzle is formed or positioned in the elongate nozzle insert 6. The nozzle insert is formed as a substantially cylindrical body.

The nozzle insert has a nozzle bore (illustrated in subsequent figures) extending through the nozzle insert in a generally perpendicular orientation to the axis of rotation of the insert body. The nozzle bore has an inlet end (inlet orifice) and an outlet end (outlet orifice) configured for fluid flow therethrough. As shown in subsequent drawings, the inlet end is larger than the outlet end, with the nozzle bore narrowing as it extends from the inlet end to the outlet end to constrict fluid flow through the nozzle bore such that the nozzle bore functions as a nozzle when the nozzle insert is positioned in the nozzle body in the RUN position.

The nozzle insert 6 is positioned through a detent plate assembly 12 into a nozzle bore 10 formed in the nozzle assembly body 4. The detent plate housing 13 has a series of operating indicators, "RUN" 20, "OFF" 22, "FLUSH" 24, and "LINE FLUSH" 26 on the outer surface of the detent plate housing. The nozzle insert is configured with an indicator knob 9. The indicator knob is configured to point at the operating indicator to indicate the position of the nozzle of the nozzle insert in the nozzle bore. In FIG. 1 the nozzle insert is depicted in the "RUN" position, meaning the nozzle is oriented within the nozzle bore such that fluid flows from the input, through the constricting nozzle, and onto the fluid distributor plate 7. When the nozzle insert is rotated to the "OFF" position, the nozzle insert blocks flow through the nozzle insert.

The nozzle insert is configured such that fluid enters the nozzle assembly along fluid path B and passes through the nozzle assembly body, through the nozzle, and to the sprinkler distribution disc 7 when the sprinkler is operated with the nozzle insert in the run position depicted. In the flush position, the nozzle insert is reversed such that fluid flows in a reverse direction through the nozzle bore within the nozzle insert to clear debris from the nozzle. In the line flush position, the nozzle insert is oriented such that a channel on the side of the nozzle insert is positioned such that fluid flowing into the nozzle assembly is directed in the channel of the nozzle insert and out a flush port on the side of the body. The LINE FLUSH position allows for the flushing the irrigation line and nozzle assembly upstream from the nozzle without flushing any debris through the nozzle.

A detent plate assembly 12 utilizes a detent plate 14 housed within a detent plate housing 13. The detent plate housing has an opening 15 through which a tab 17 of the detent plate extends. The detent plate tab 17 is configured for a user to depress the tab 17 toward the nozzle insert to release the detent on the rotation of the nozzle insert. A biasing mechanism, depicted as a spring 18, biases the detent plate to arrest rotation of the nozzle insert. The detent plate has a detent 46 (shown in FIG. 3) that is biased into one of a series of detent notches on the circumference of the body of the nozzle insert to index the nozzle insert.

The detent plate has an opening 16 through which the nozzle insert is positioned. The angled sides of the detent and detent faces allow the detent to release from the detent grooves as the nozzle is manually rotated. The detent slides along the circumferential ring 41 until it engages the next detent notch. To remove the nozzle insert, the detent tab must be depressed toward the nozzle insert. Release of the detent from the nozzle insert outer edges 72, 76 allows the removal and insertion of the nozzle. The nozzle insert is preferably configured with four detent notches configured to coincide with an operating position shown on the face plate of the detent plate. In a preferred embodiment the detent plate assembly is formed with two opposing sides 23, 25 with a cavity formed between that houses the detent plate.

In the depicted embodiment, a nozzle carrier is attached to the nozzle assembly body. The nozzle carrier 21 in the depicted embodiment has two cylindrical nozzle receivers 32, 34 housing two spare and/or replacement nozzles 28, 30. The replacement nozzles are held in by two retaining clips 31, 33 having tabs 35, 37.

Figure 2:
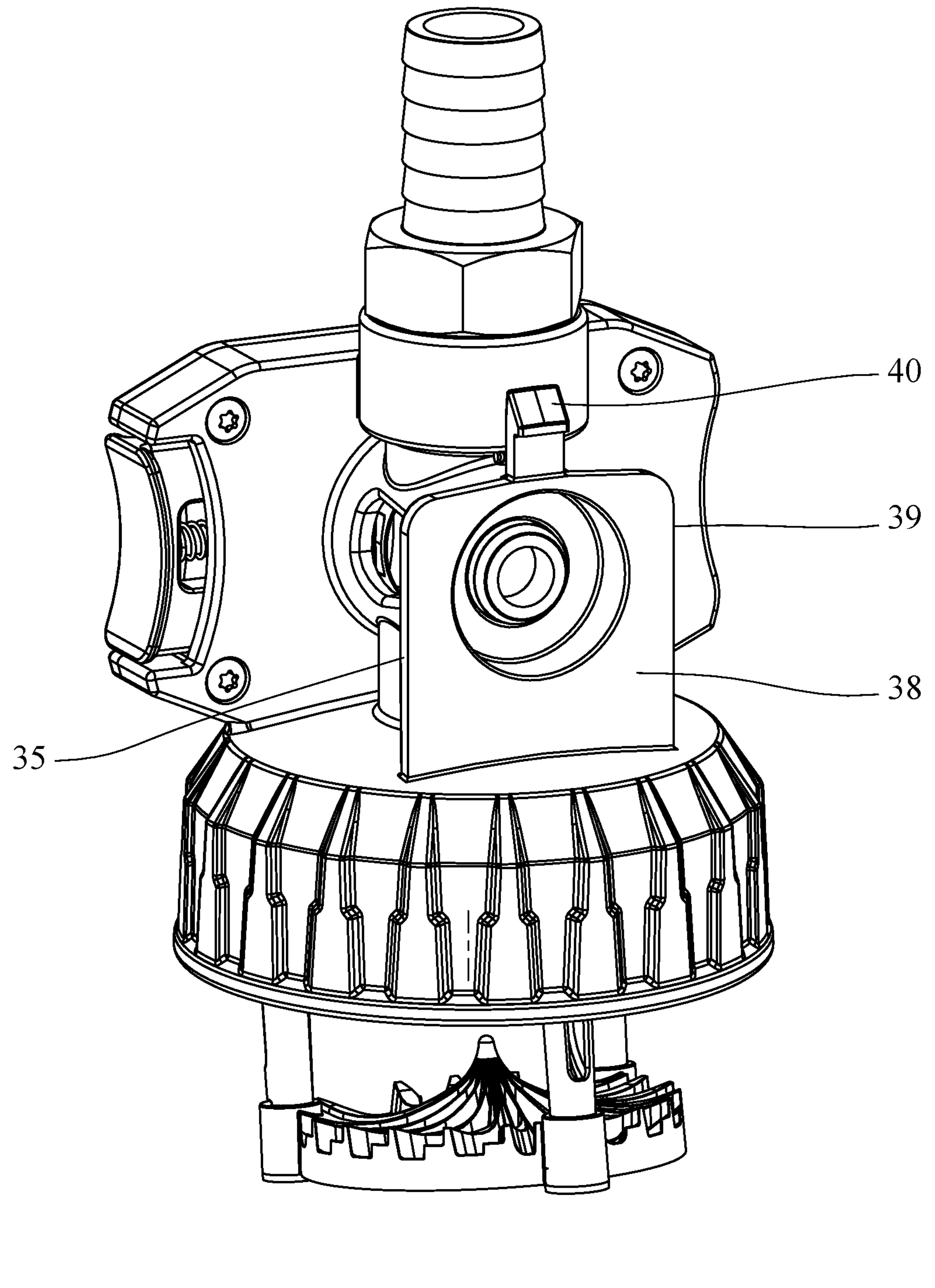
FIG. 2 illustrates a back perspective view of the nozzle assembly of FIG. 1.

FIG. 2 illustrates a back view of the nozzle assembly with the nozzle carrier detached. The nozzle carrier is configured to mount on a back panel 38 of the nozzle assembly body 4. A clip 40 is configured to retain the nozzle carrier on the plate 38. In the depicted embodiment, the nozzle carrier is configured to attach to the plate by utilizing a track and channel assembly. The edge of the plate 38 forms a track 39 onto which the opposing channels 60, 62 (shown in FIG. 3) are slid down onto. The nozzle carrier has a tab 63 onto which the clip 40 extending from the rear panel 38 of the nozzle assembly clips.

Figure 3:
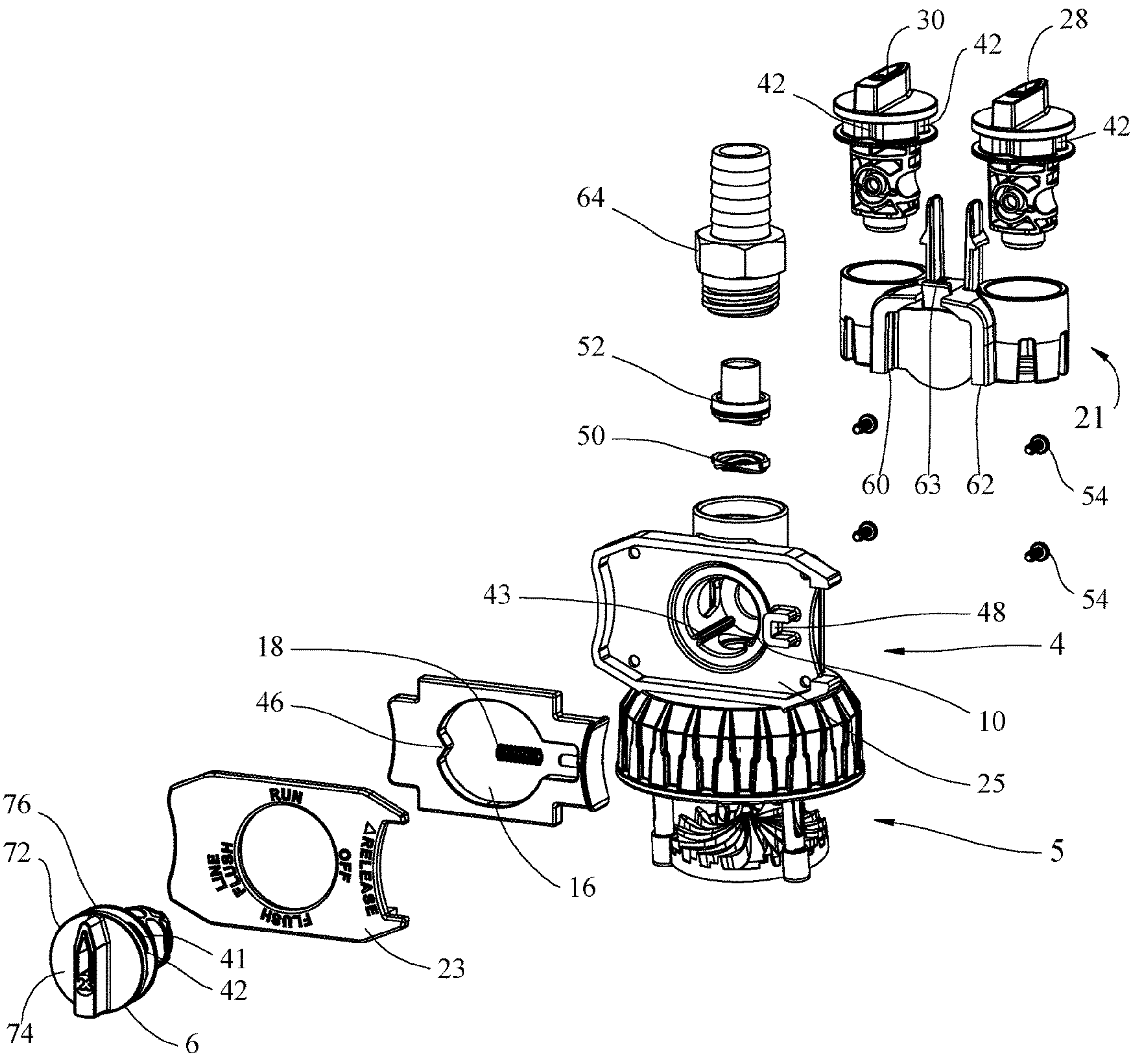
FIG. 3 illustrates an exploded view of the nozzle assembly of FIGS. 1-2.

FIG. 3 illustrates a partially exploded view of the nozzle assembly of FIG. 1. The nozzle insert 6 is removed from the bore 10 of the nozzle assembly body. The front side 23 of the detent plate assembly has been removed illustrating detent plate 14 having detent 46. A spring 18 biases the detent plate such that the detent 46 is biased into the detent notches 42 of the nozzle insert. The detent notches (example being 42) are positioned extending into a circumferential ring 41. The second side 25 of the detent plate has a spring seat 48 which provides a base against which spring 18 extends to bias the detent plate to index the nozzle insert. The nozzle body utilizes a nozzle seat (not shown) into which seal 50 is positioned. The seal allows for the rotation of the nozzle insert and prevents fluid from bypassing the nozzle insert. Seal retainer 52 retains the nozzle seal 50 in the correct position. Connectors 54 attach the faceplate of the detent plate housing 13 to the detent plate housing. The bore in the nozzle assembly body is provided with two ribs (one rib is illustrated in FIG. 3 at 42) to align the nozzle insert in the bore. The outer circumference 72 of the outer face 74 of the nozzle insert serves to retain the biasing tab 46 within the circumferential groove in which the notches 42 are positioned. The circumferential groove has a second edge 76 into which the notches 42 is positioned. The detent 46 engages the detent notches 42 between outer circumference 72 and second edge 76 to retain the nozzle insert in the nozzle assembly body 4.

Figure 4:
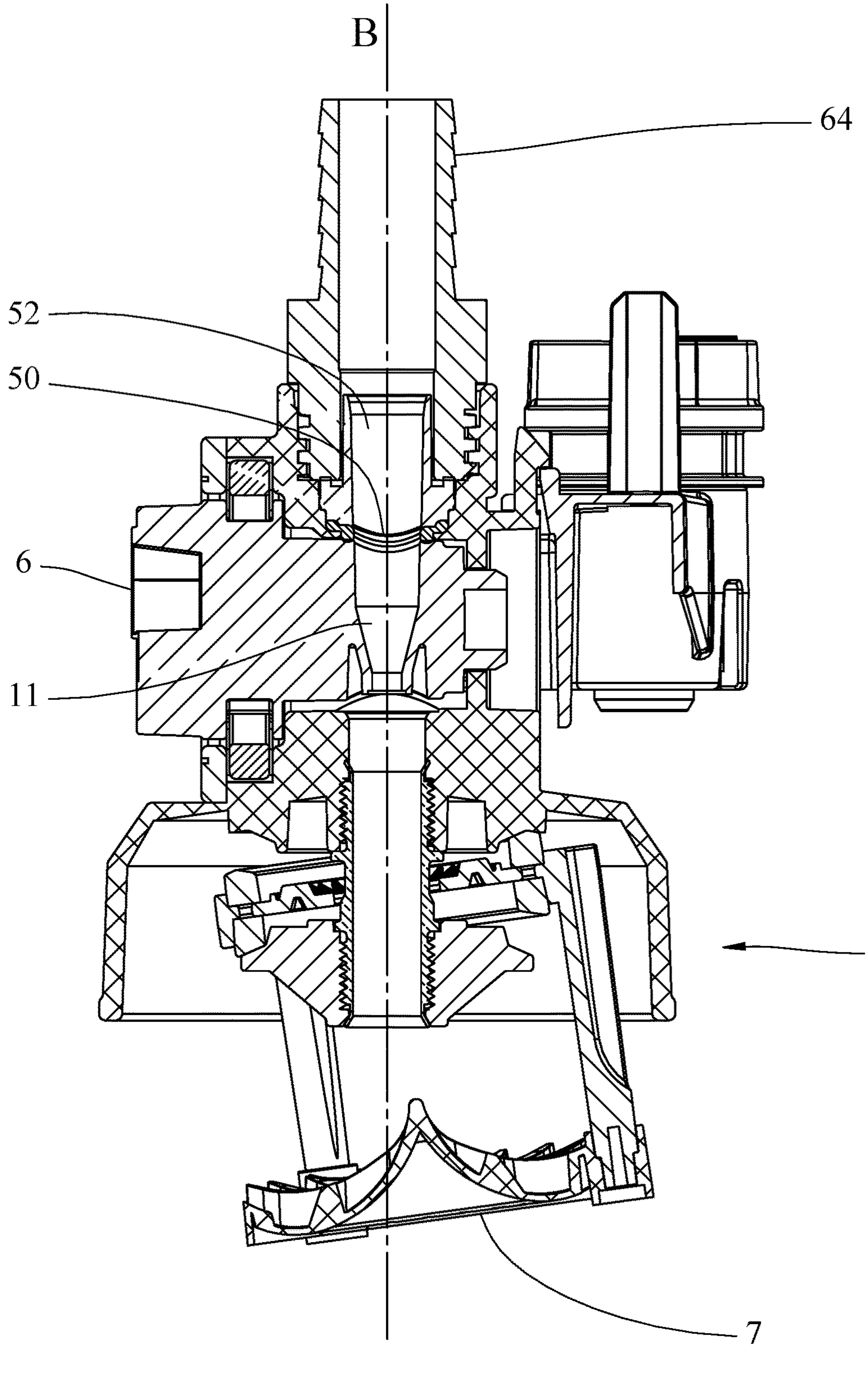
FIG. 4 illustrates a section view of the nozzle assembly of FIGS. 1-3.

FIG. 4 illustrates a section view of the embodiment depicted in FIGS. 1-3. The nozzle insert is depicted in the run position providing a fluid flow path B. Fluid enters the nozzle assembly at adapter 64 passes through seal retainer 52 and into the nozzle bore 11 of the nozzle insert 6. The nozzle restricts fluid flow causing a stream of fluid to be sprayed onto the deflector plate 7. The sprinkler attachment 5 can be constructed as permanently attached to the nozzle assembly or removable from the nozzle assembly.

Figure 5A:
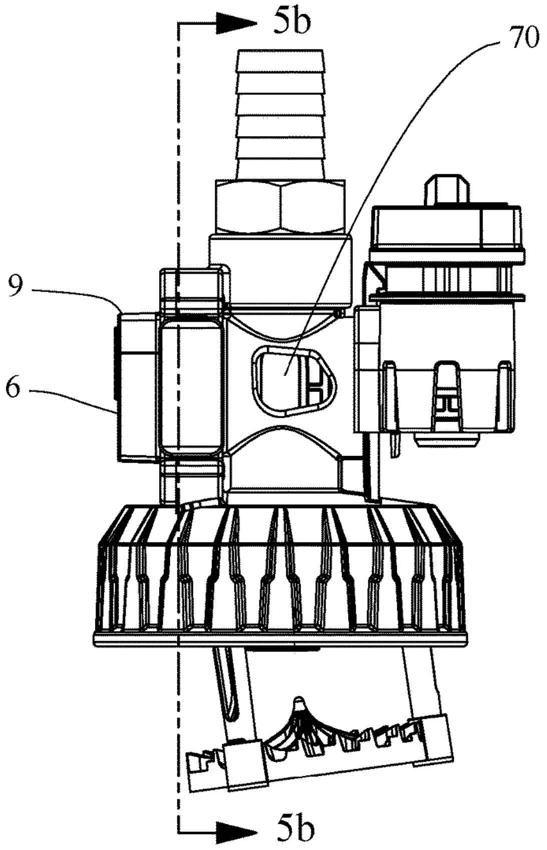
FIG. 5*a* illustrates a side view of the nozzle assembly of the FIG. 1-4.
Figure 5B:
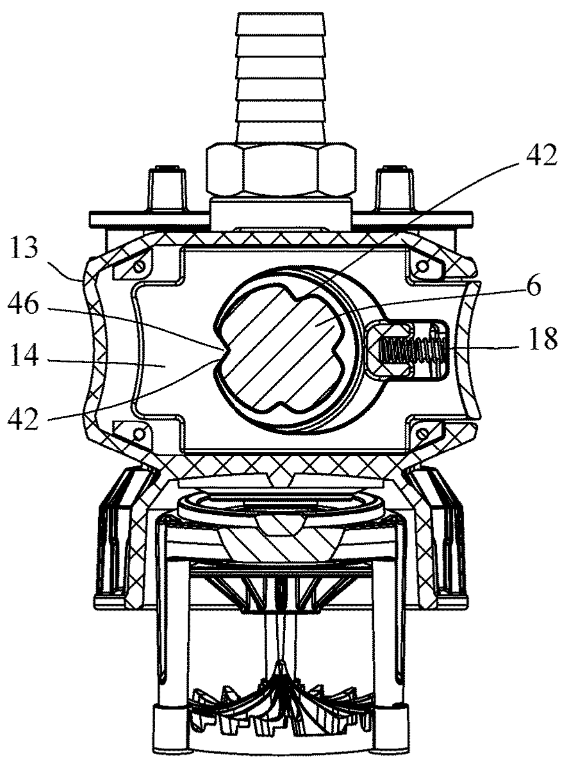
FIG. 5*b* illustrates a section view of the nozzle assembly of FIGS. 1-5*b* along section 5*b* of FIG. 5*a*.

FIG. 5*b* illustrates a side view of the nozzle assembly and sprinkler assembly of FIGS. 1-4. A discharge port 70 is positioned on the side of the nozzle assembly body to allow for fluid to flow out of the nozzle assembly body when the nozzle is in the line flush position.

FIG. 5*b* illustrates a section view along section line 5*b* of FIG. 5*a*. FIG. 5*b* illustrates the detent plate 14 positioned within the detent plate housing 13. Detent 46 is shown positioned within a notch of the series of notches 42 positioned on the circumference of the nozzle insert. The spring 18 is shown biasing the detent plate 14 to cause detent 46 ton index the nozzle insert with notch 42.

Figure 6A:
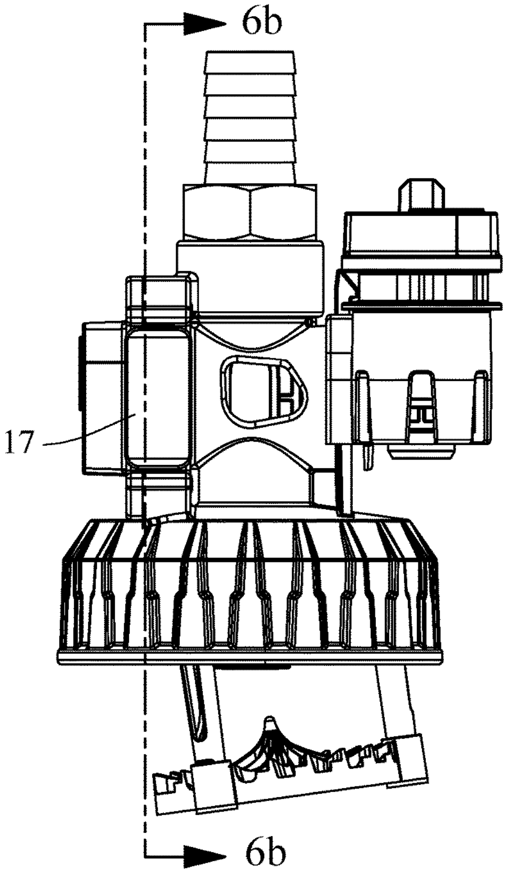
FIG. 6*a* illustrates a side view of the nozzle assembly of FIGS. 1-5*b* in a nozzle release position.
Figure 6B:
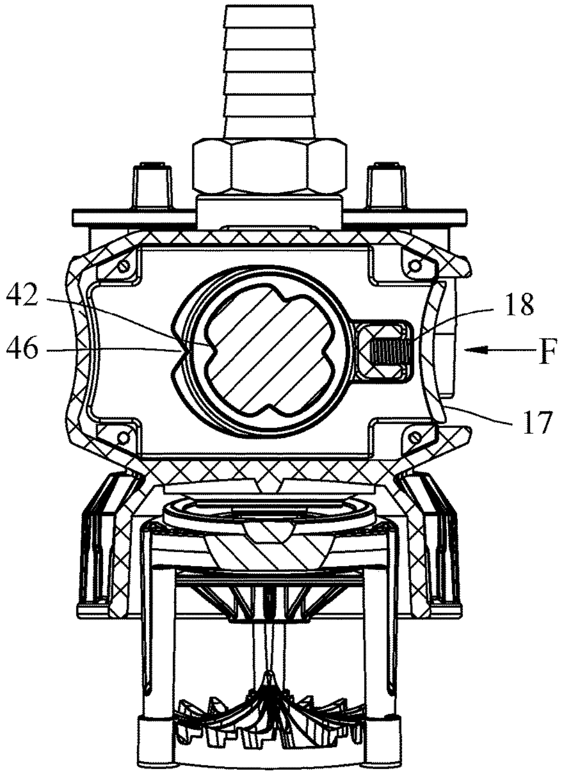
FIG. 6*b* illustrates a section view of the nozzle assembly of FIGS. 1-6*a* along line 6*b* of FIG. 6*a* in a nozzle release position.

FIG. 6*a* illustrates the nozzle with the actuation surface 17 depressed. FIG. 6*b* illustrates a section view along line 6*b* of FIG. 6*a*. The tab 17 has been depressed along force line F compressing the biasing spring 18 and forcing the detent 46 out of the circumferential groove. The nozzle insert 6 can now be removed.

Figure 7A:
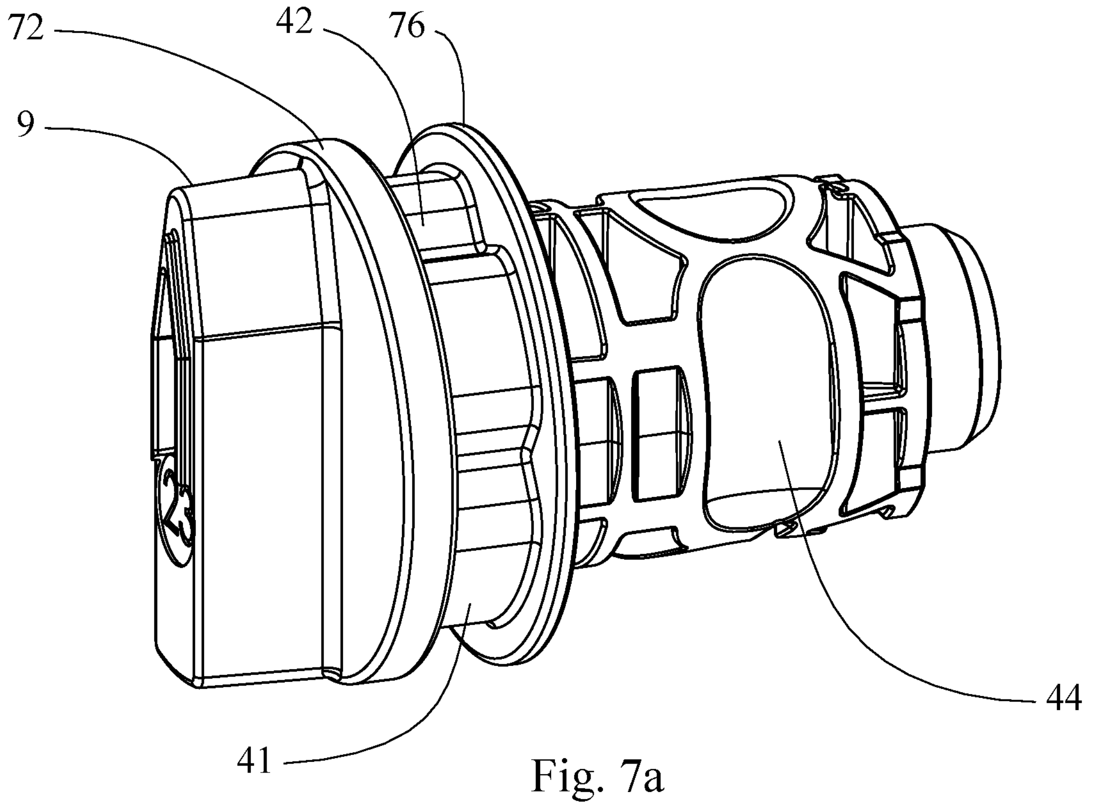
FIG. 7*a* illustrates a nozzle insert of FIGS. 1-6*b*.
Figure 7B:
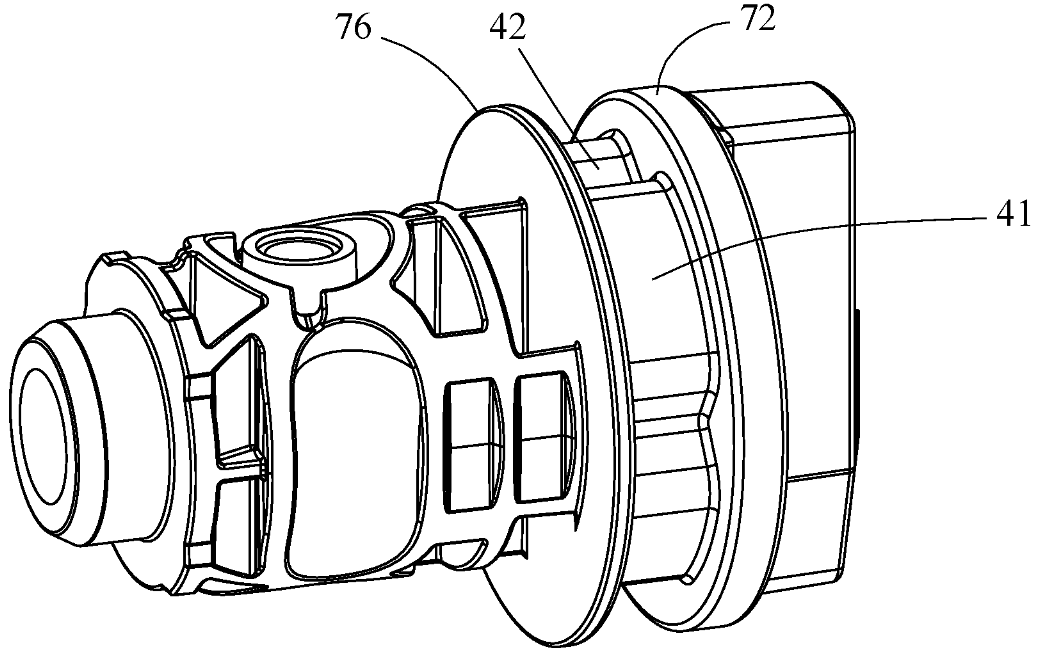
FIG. 7*b* illustrates a second view of the nozzle insert of FIG. 7*a*.

FIG. 7*a* illustrates a side perspective view of an embodiment of a nozzle insert. The knob 9 is positioned pointing upward. A flush groove 44 is positioned in the circumference of the nozzle insert is illustrated. The circumferential ring 78 has detent notches extending into the ring. FIG. 7*b* illustrates a side perspective view of the nozzle insert of FIG. 7*a*.

Figure 8:
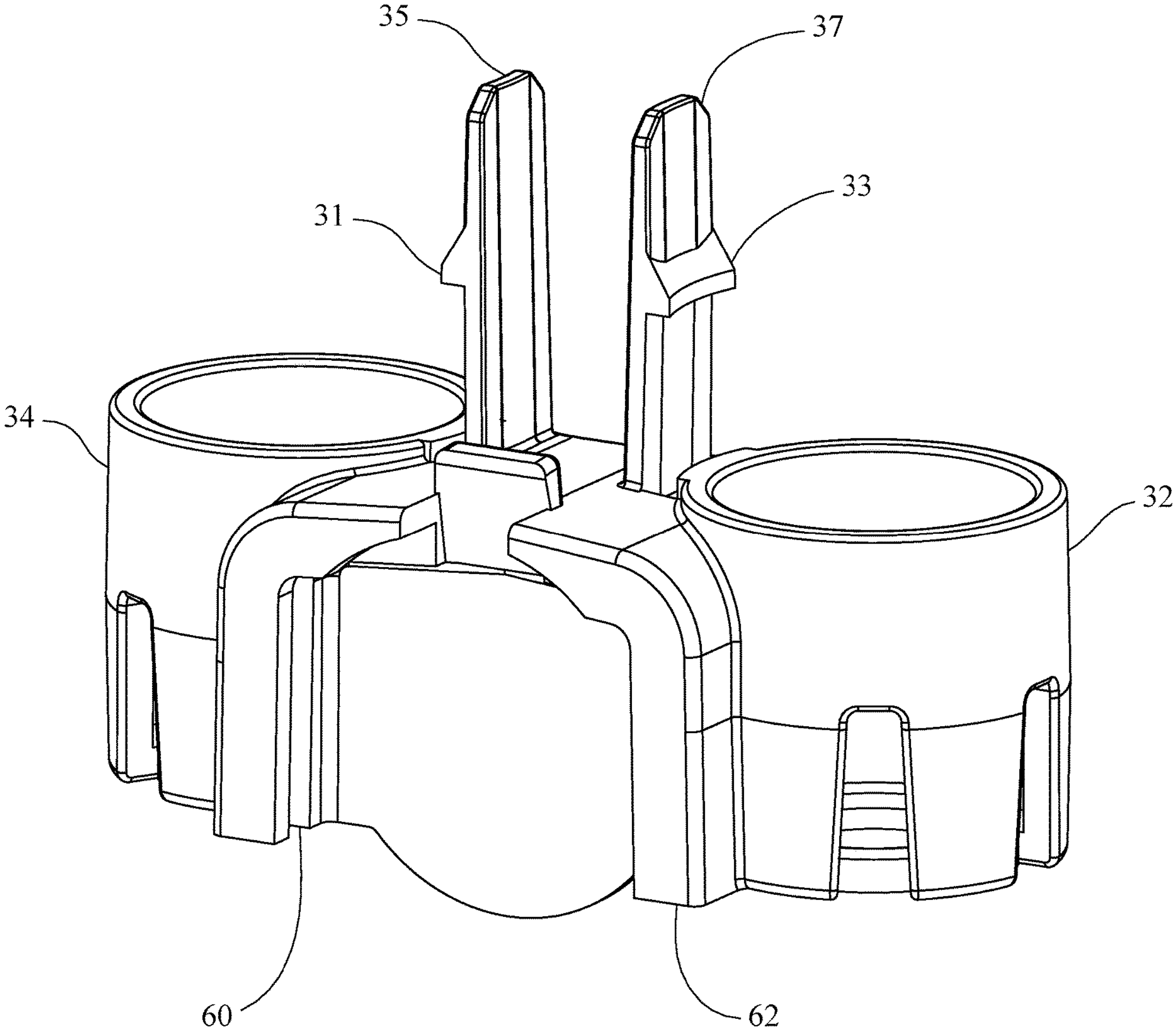
FIG. 8 illustrates an embodiment of a nozzle carrier for use with a nozzle assembly.

FIG. 8 illustrates a preferred embodiment of a nozzle carrier. Two cylindrical nozzle storage housings 32, 34 are provided for housing spare and/or replacement nozzles. Opposing tabs 35, 37 extend upward with clips 31, 33 positioned to retain the nozzle inserts in the cylindrical housing. The clips are released by pushing or bending each tab toward the other. Opposing channels 60, 62 are positioned for placement on the track 39 of the nozzle body rear plate.

Figure 9:
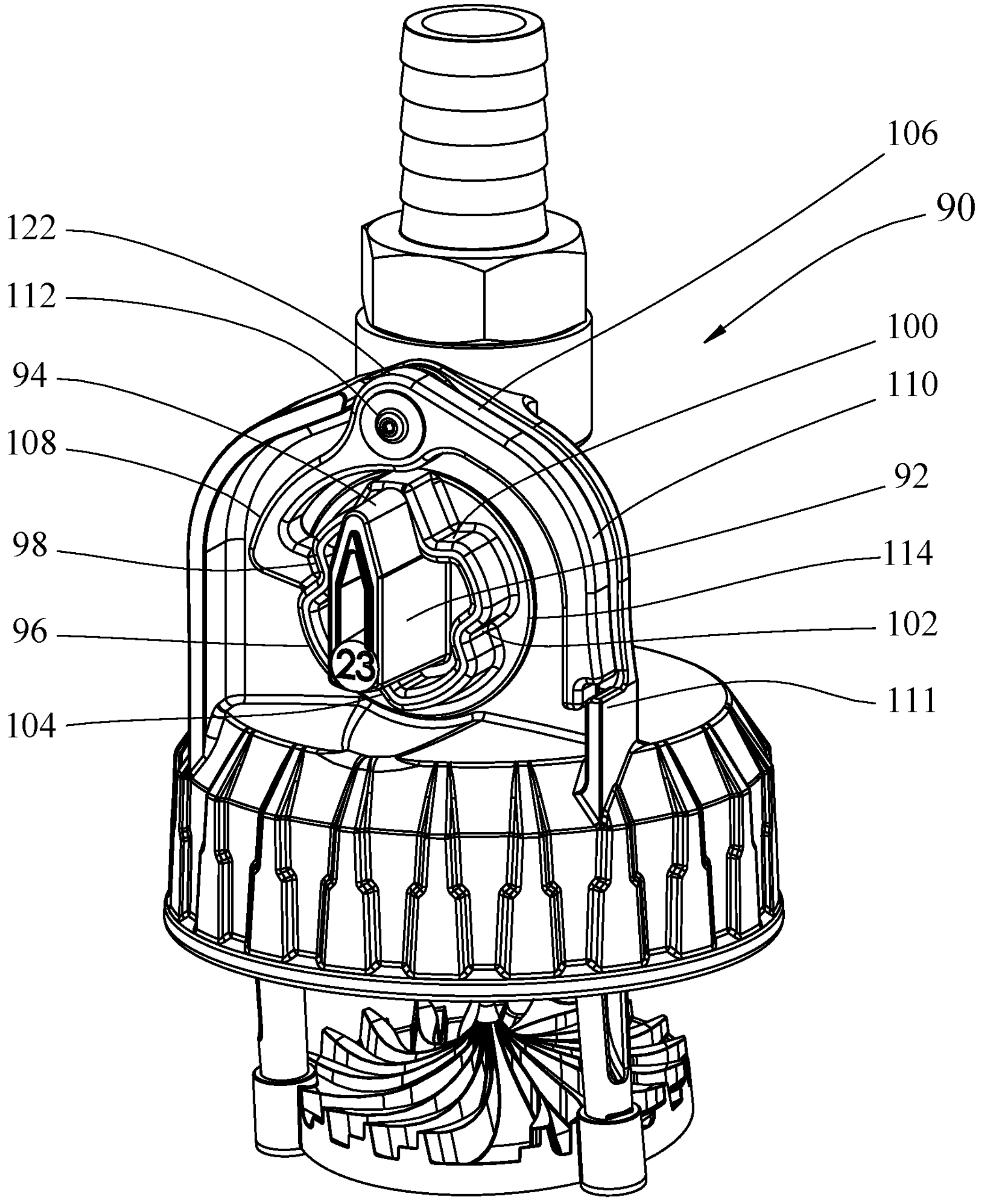
FIG. 9 illustrates a perspective view of a second embodiment of a nozzle assembly.
Figure 10:
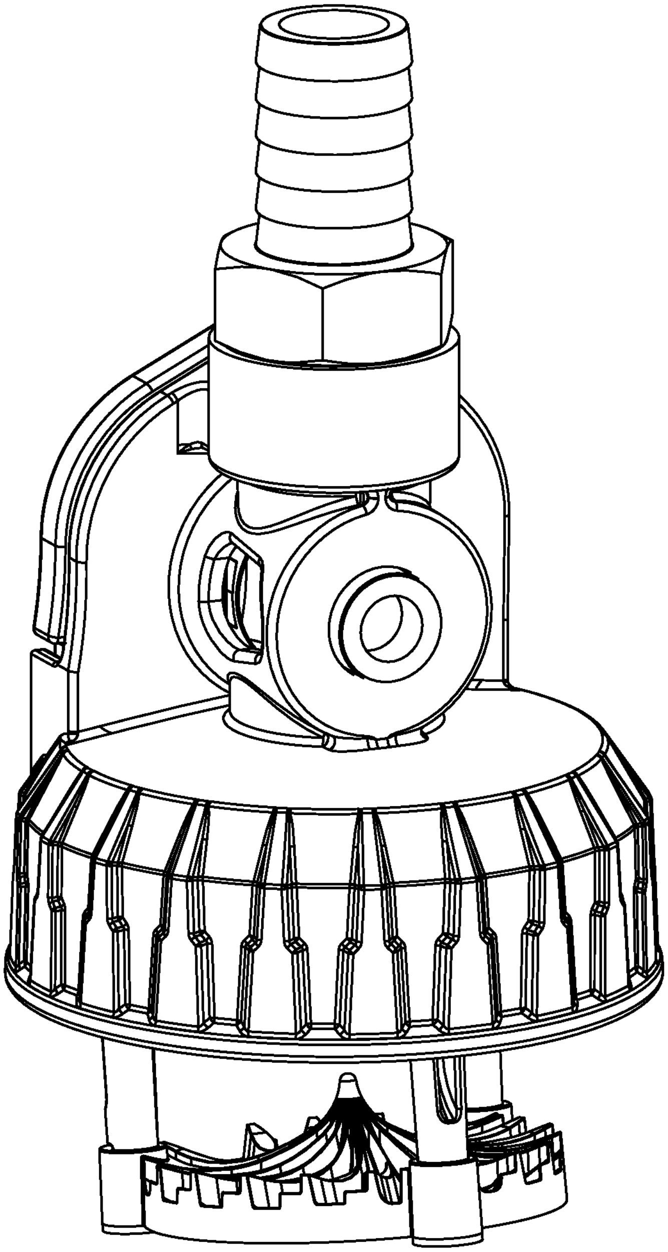
FIG. 10 illustrates a back perspective view of the nozzle assembly of FIG. 9.

FIGS. 9-14 illustrate a second embodiment of a rotating nozzle assembly 90. The nozzle insert 92 has a series of detent notches 98, 100, 102, 104 formed in the circumference 96 of the nozzle insert. A lever 106 is attached to the face of the nozzle assembly body. The lever has a first leg 108 and a second leg 110. The two legs are connected at a pivot point 112 formed by an opening 119 (shown in FIG. 11) in a shoulder 122 of the lever. The lever has a detent formed at the first end of the lever. The lever is biased by a torsion spring 116 (shown in FIG. 11) such that the detent is biased into a detent notch. The second leg 110 of the lever is depressed to release the detent from the detent notch of the nozzle insert. The nozzle body in the depicted embodiment is shown with a stop tab 111 that prevents over rotation of the end 113 of the lever. The nozzle insert can then be rotated with the indicator nozzle knob 94 indicating the desired position of the nozzle insert. Exemplary running indicators are shown and described above regarding FIGS. 1-8. FIG. 10 illustrates a rear view of the embodiment of FIG. 9.

Figure 11:
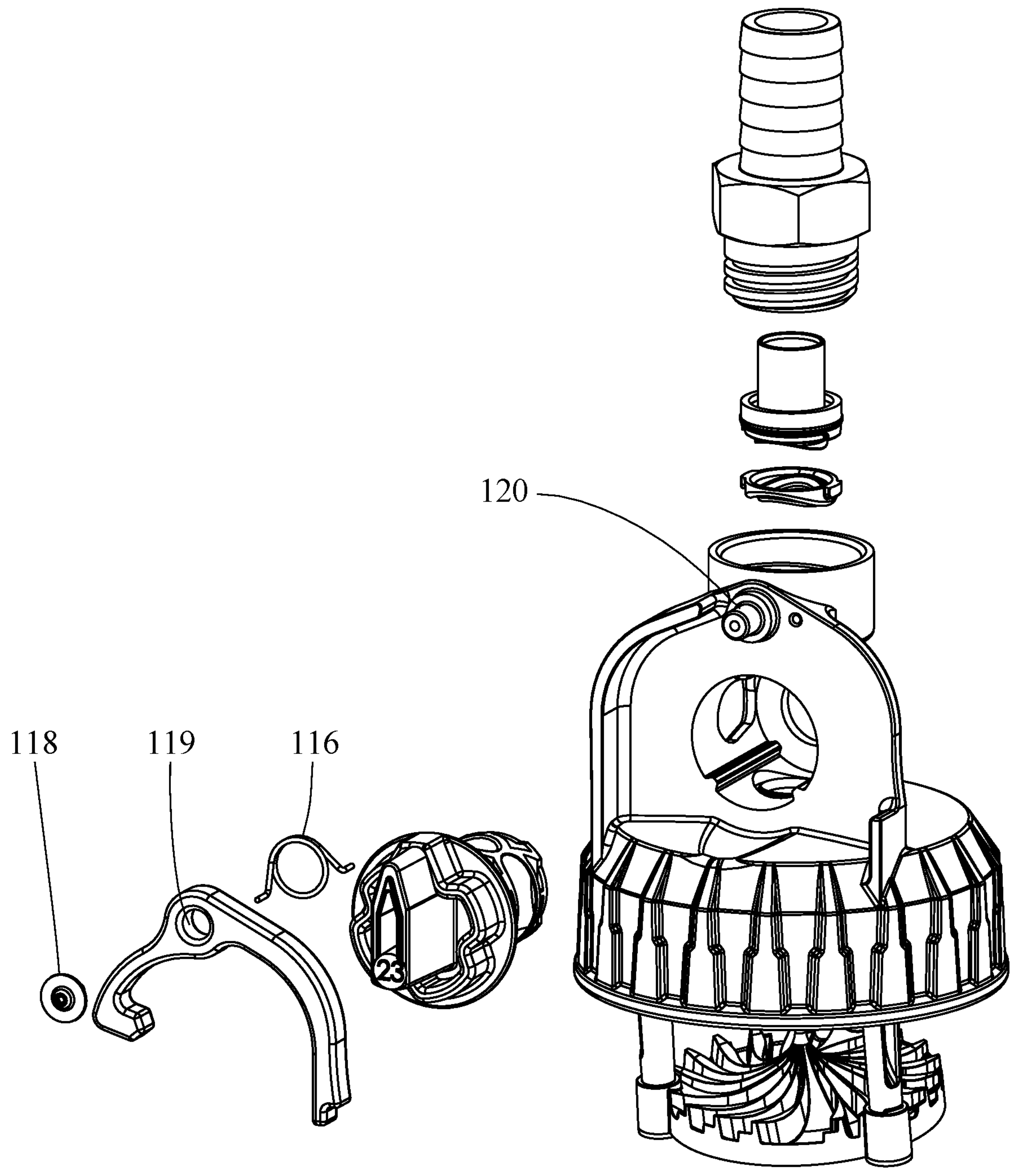
FIG. 11 illustrates a partially exploded view of the nozzle assembly of FIGS. 9-10.

FIG. 11 illustrates a partially exploded view of the embodiment of FIGS. 9 and 10. The lever is shown with opening 119. A connecter 118 connects the lever through the opening to a fulcrum 120. The lever pivots on the fulcrum 120 to index the nozzle insert in each operating position and to release the nozzle insert from the nozzle body.

Figure 12:
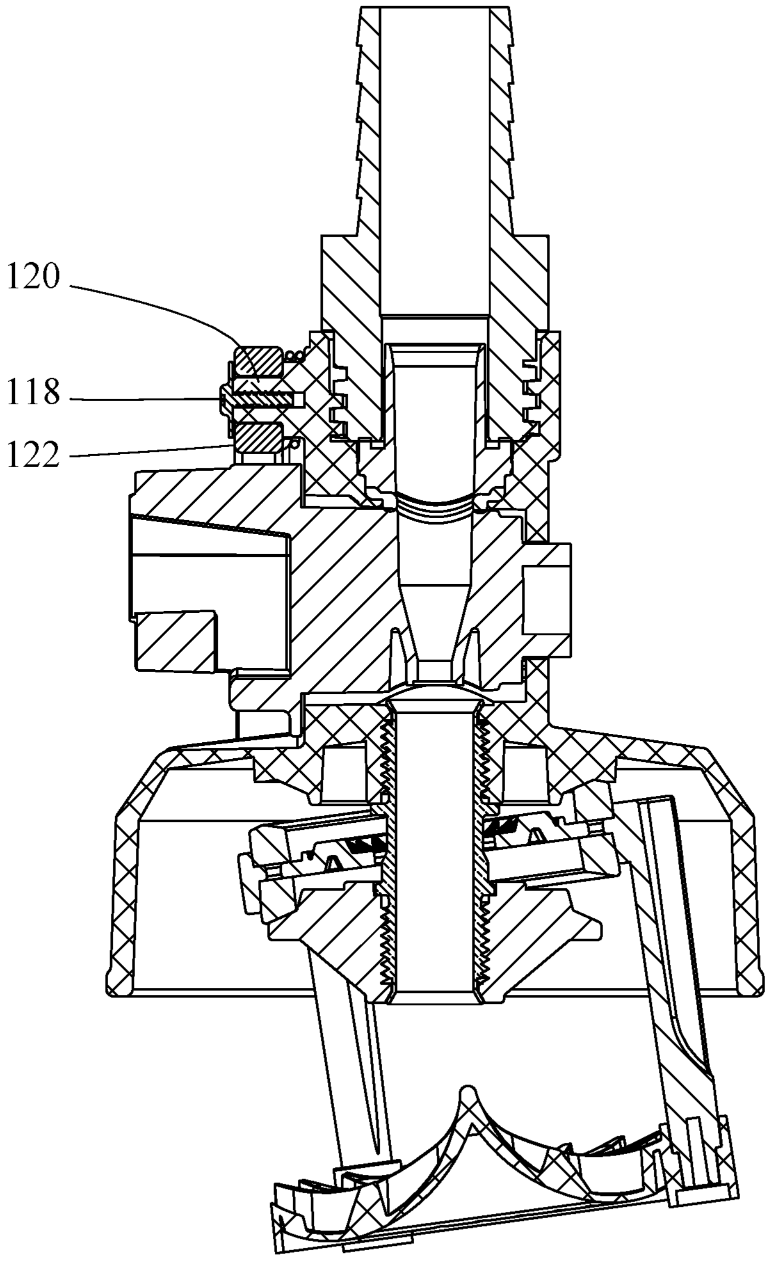
FIG. 12 illustrates a section view of the nozzle assembly of FIGS. 9-11.
Figure 13:
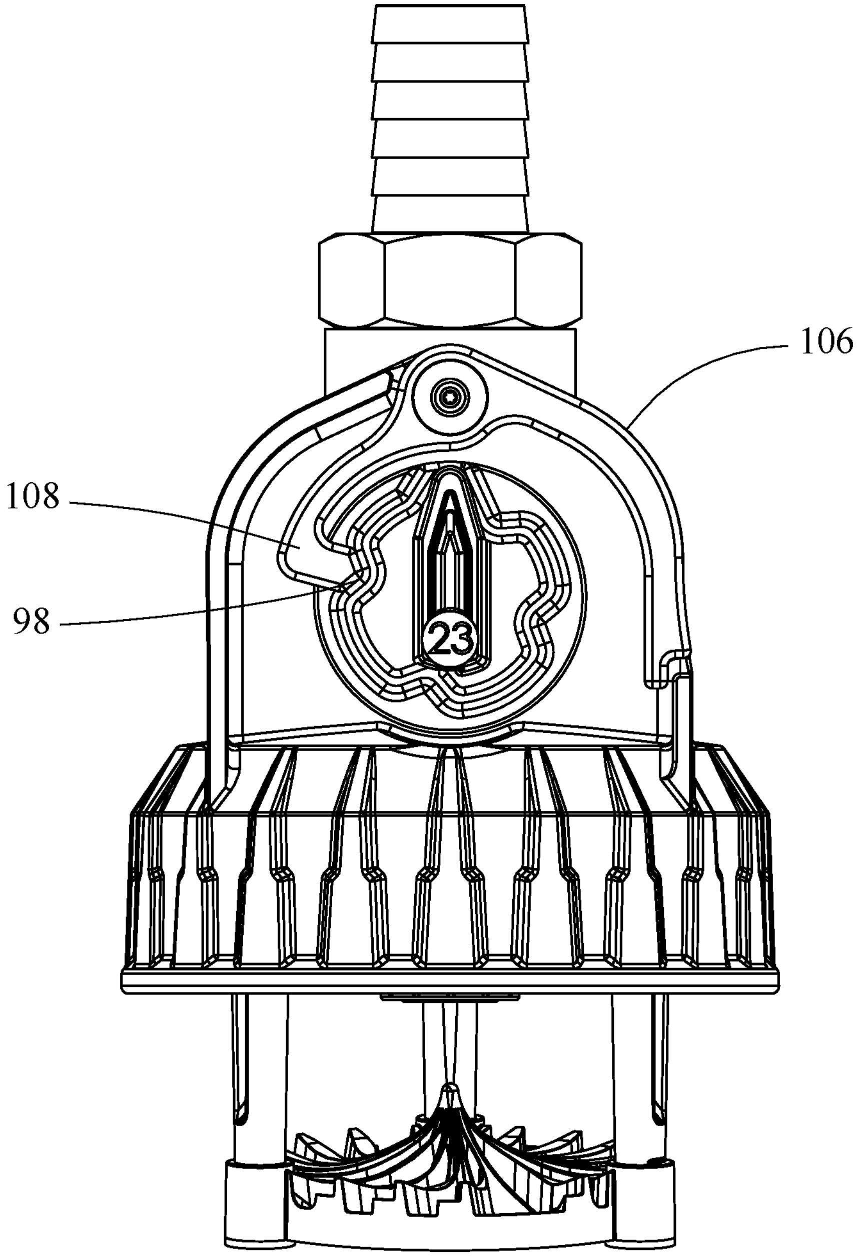
FIG. 13 illustrates a front isometric view of the nozzle of FIG. 9-12.

FIG. 12 illustrates a section view of the embodiment illustrated in FIGS. 9-11. The positioning of the lever shoulder 122 on the fulcrum 120 to provide a pivot point is illustrated. FIG. 13 illustrates a front isometric view of the embodiment of FIGS. 9-12. The first end of the lever 108 is shown in the detent position of depression 98.

Figure 14:
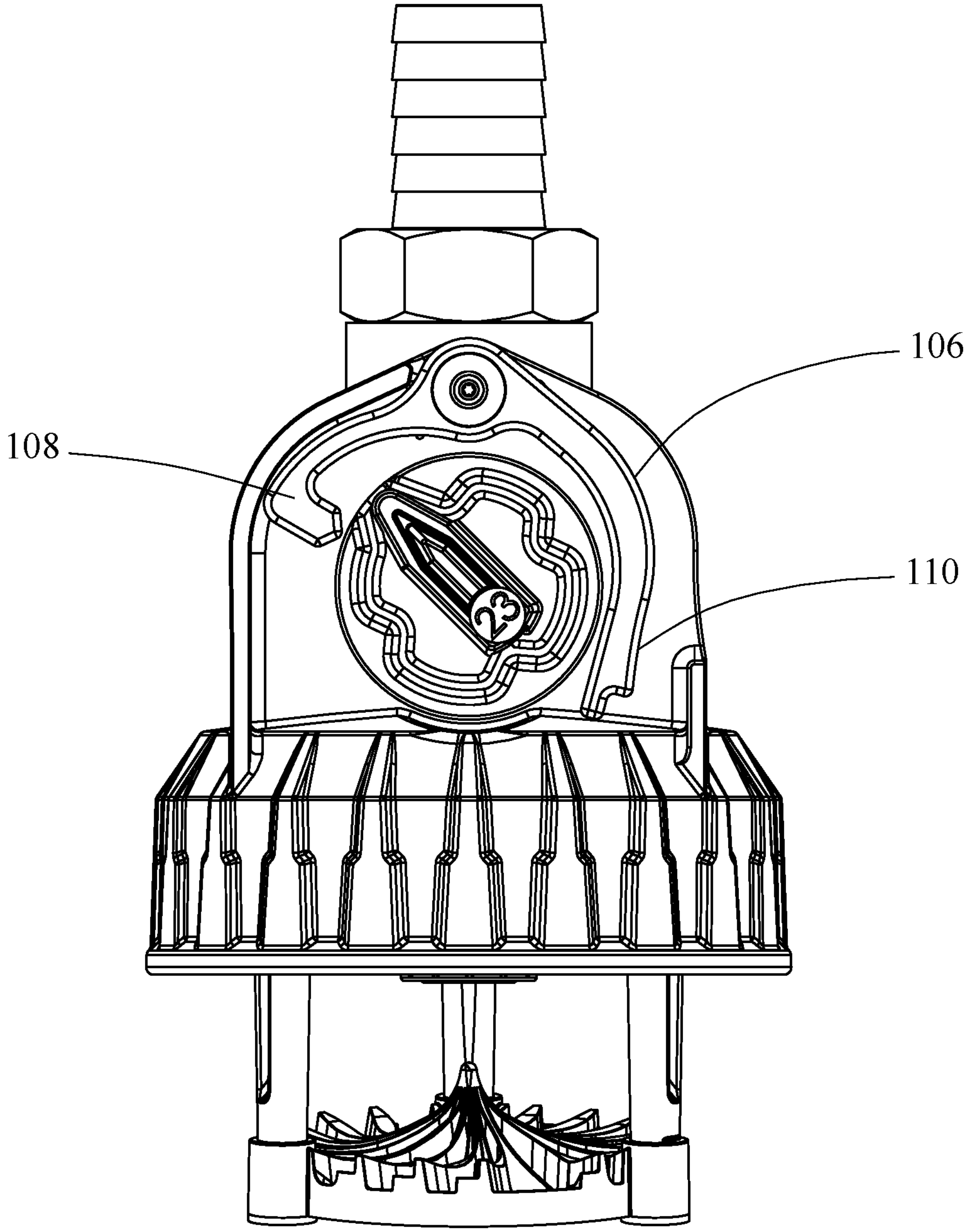
FIG. 14 illustrates a front isometric view of the nozzle of FIGS. 9-13 with the lever depressed for nozzle removal.

FIG. 14 illustrates depression of the second arm of the lever 110 to release the detent of the first arm 108 of the lever. Release of the detent on the nozzle insert allows for the removal of the nozzle insert. The torsion spring depicted in FIG. 11, biases the lever to the detent position.

Figure 15:
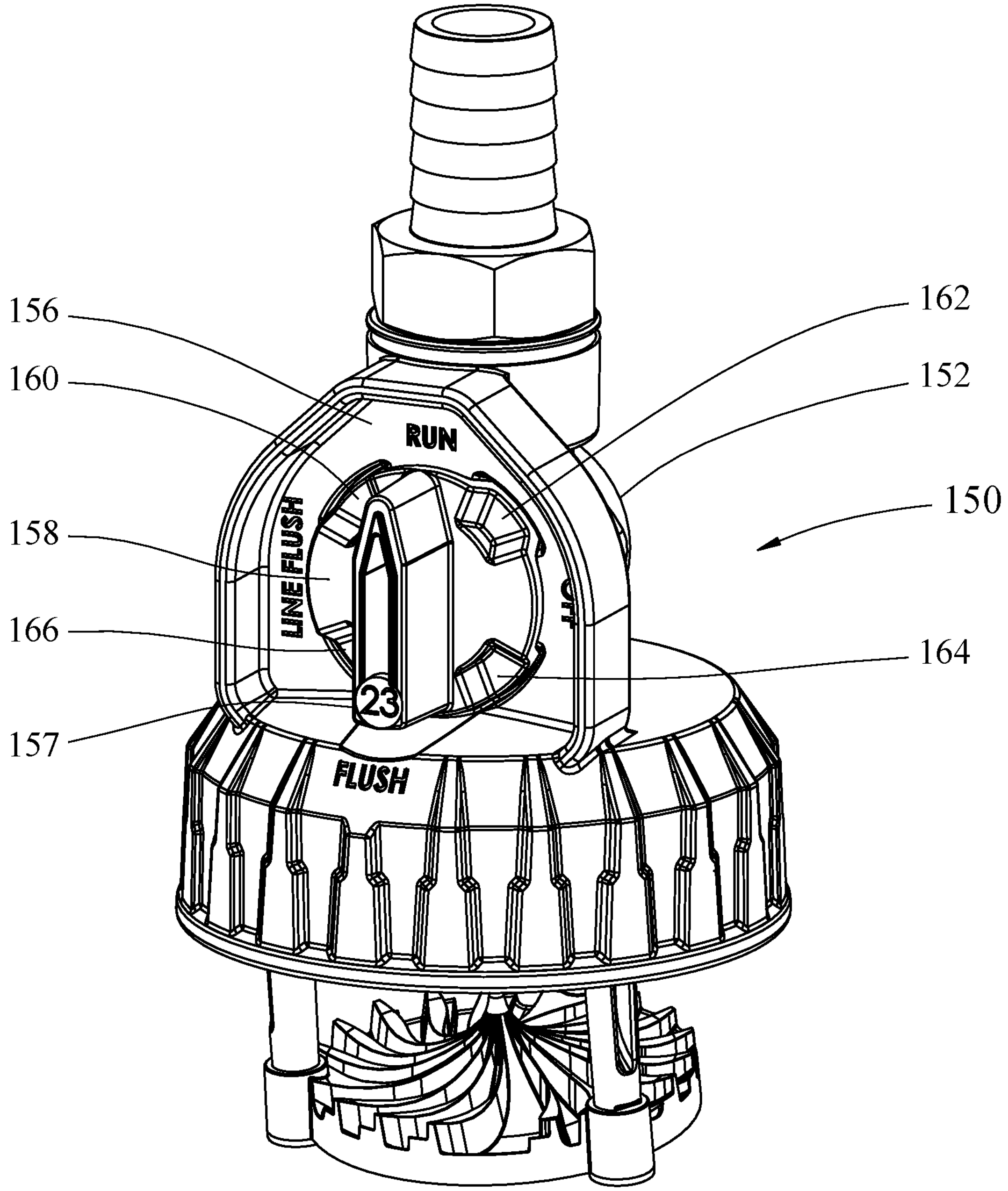
FIG. 15 illustrates a perspective view of a third embodiment of a nozzle assembly.
Figure 16:
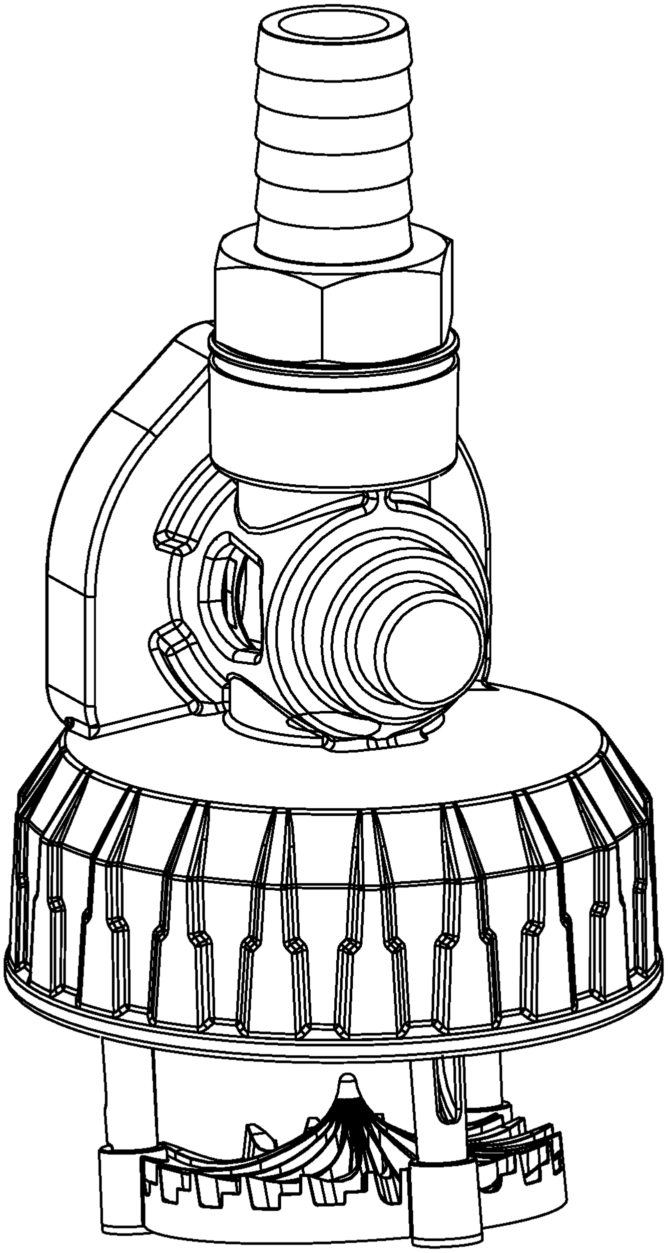
FIG. 16 illustrates a rear perspective view of the nozzle assembly of FIG. 15.
Figure 17:
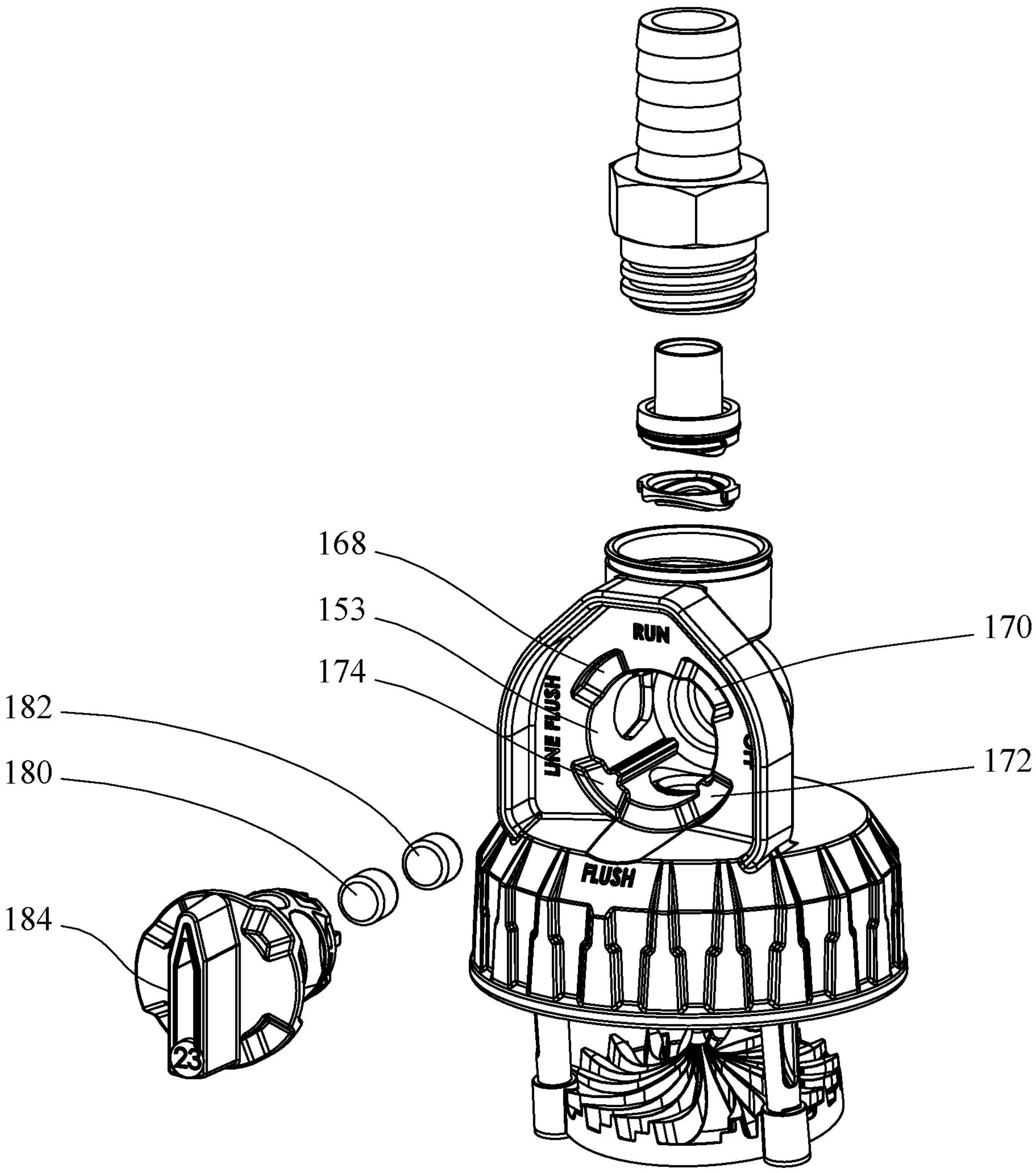
FIG. 17 illustrates a partially exploded view of the nozzle assembly of FIGS. 15-16.
Figure 18:
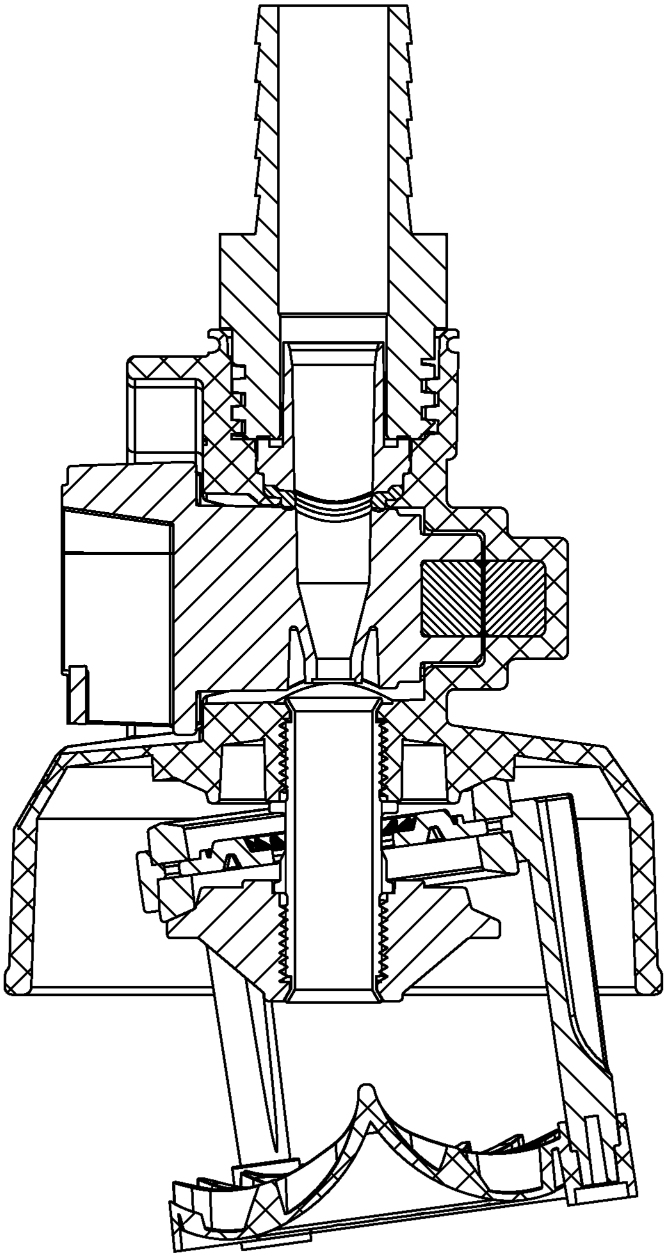
FIG. 18 illustrates a section view of the nozzle assembly of FIGS. 15-17.

FIG. 15 illustrates a third embodiment of a nozzle assembly having a rotating nozzle insert. The nozzle assembly 150 has a nozzle body 152. The nozzle body has a bore 153 (shown in FIG. 17). The nozzle insert 157 is positioned within the bore. The nozzle body has a face 156 positioned at the opening of the bore. The opening is configured for insertion of the nozzle insert through the opening into the bore. The nozzle insert 157 has a circumferential plate 158. The face has a series of detent notches 168, 170, 172, 174 formed in the face. The detent notches are configured for meeting engagement of a series of detents 160, 162, 164, 166 formed in or positioned on the circumferential plate. The nozzle insert and nozzle body are each configured with a magnet 180, 182 respectably. When the detents of the nozzle insert are aligned with the detent notches, the magnet 182 of the nozzle body attracts the magnet 180 of the nozzle insert. This attractive force maintains the nozzle insert in position with the detents aligned in the detent notches. To rotate the nozzle insert, a user grasps the indicator knob 184 and rotates the indicator knob to the next operating position. The knob can be configured such that a pulling force is required to overcome the magnetic attraction between the magnets and/or the depressions and tables can be configured such that rotational force is sufficient to rotate the insert to the next operating position. For example, the depressions can be formed with ramp like sides on which the tabs slide when rotated into and out of the depressions. The user can then rotate the nozzle insert to the next position in which the tabs align with the depressions. The magnetic force will then maintain the nozzle insert in the selected operating position.

Alternatively the tabs and detent notches can be reversed, with the detent notches positioned on the nozzle insert, and one or more tabs positioned in the nozzle body.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A nozzle assembly having a side loading nozzle, said nozzle assembly comprising:

a nozzle body comprising a flow passage along a longitudinal flow axis of said nozzle body from a fluid input at a first end of said nozzle body to a fluid output at a second end of said nozzle body, said nozzle body comprising a face and defining a nozzle body bore formed in said nozzle body extending from said face through said nozzle body and intersecting said flow passage in a generally perpendicular orientation to said flow passage, said nozzle body bore defined by a substantially cylindrical wall within said nozzle body;

a nozzle insert removably positioned within said bore in said nozzle body, said nozzle insert comprising an elongated insert body having an insert axis about which said nozzle insert rotates within said insert body, wherein said nozzle insert is rotatable to plural operating positions, said nozzle insert comprising a forward end face comprising a turning knob, wherein a nozzle bore extends through said insert body on an axis intersecting said insert axis, wherein said nozzle bore comprising a first end and a second end and configured to restrict fluid flow therethrough from said first end to said second end, wherein said nozzle bore is configured to align with said flow passage of said nozzle body to provide a continuous fluid passage;

at least one releasable detent and at least one detent notch, wherein one of said releasable detent or said at least one detent notch is positioned on a circumference of said nozzle insert, wherein the other of said at least one releasable detent is positioned on said nozzle body, wherein said releasable detent is biased to index said nozzle insert at said at least one detent notch, wherein said releasable detent is configured to be released to allow rotation of said nozzle insert, wherein said at least one detent notch corresponds to an operating position.

2. The nozzle assembly having a side loading nozzle of claim 1, wherein said nozzle assembly comprises a lever, wherein said lever comprises a first end and a second end, wherein said lever is pivotally attached to said nozzle assembly, wherein said first end of said lever comprises said detent, wherein said second end of said lever is configured such that depression of said second end of said lever releases said detent from engagement of one of said detent notches.

3. The nozzle assembly having a side loading nozzle of claim 2, wherein said nozzle assembly comprises a spring to bias said first end of said lever into detent with one of said detent notches.

4. The nozzle assembly having a side loading nozzle of claim 3, wherein said spring comprises a torsion spring.

5. The nozzle assembly having a side loading nozzle of claim 2, wherein said nozzle body comprises a stop tab configured for to stop rotation of said second end of said lever, wherein said stop tab is adjacent to said keeper tab notch and configured to stop rotation of said keeper tab.

6. The nozzle assembly having a side loading nozzle of claim 2, wherein said lever is pivotally attached to said face of said body.

7. The nozzle assembly having a side loading nozzle of claim 1, wherein said nozzle body is attached to a sprinkler body.

8. The nozzle assembly having a side loading nozzle of claim 1, wherein said nozzle body is configured for releasable attachment to a sprinkler body.

9. The nozzle assembly having a side loading nozzle of claim 1, wherein said face comprises a detent plate assembly, wherein said detent plate assembly comprises a detent plate housing, wherein a detent plate is slidably configured in said detent plate housing, wherein said detent plate housing comprises an opening for positioning therethrough of said nozzle insert and aligned with said nozzle bore of said nozzle body, wherein said detent plate comprises an opening therethrough for passage therethrough of said nozzle insert, wherein said detent plate comprises said detent, wherein said detent plate is configured to bias said detent into a detent notch of said nozzle insert.

10. The nozzle assembly having a side loading nozzle of claim 9, wherein said detent plate assembly comprises a spring configured to bias said detent plate such that said detent engages with one of said detent notches.

11. The nozzle assembly having a side loading nozzle of claim 10, wherein said nozzle insert comprises a substantially cylindrical shape having a channel formed in an exterior wall of said nozzle insert, said channel configured to direct fluid flow from said nozzle body out an opening in a side of said nozzle body.

12. The nozzle assembly having a side loading nozzle of claim 9, wherein said detent plate comprises a push surface configured such that depression of said push surface releases detent of said detent plate on said nozzle insert.

13. The nozzle assembly of claim 9, wherein said detent comprises an extension into said opening in said detent plate.

14. The nozzle assembly having a side loading nozzle of claim 1, wherein said nozzle body comprises a nozzle carrier mount.

15. The nozzle assembly having a side loading nozzle of claim 14 further comprising a nozzle carrier, wherein said nozzle carrier comprises a cylinder configured for receiving said nozzle insert, wherein said nozzle carrier comprising a clip configured to releasably engage said circumferential ring to retain said nozzle inert in said nozzle carrier.

16. The nozzle assembly having a side loading nozzle assembly of claim 1, wherein said nozzle insert comprises a stop depression, wherein said stop depression is configured to align with said flow channel to prevent flow through said nozzle body from said nozzle body inflow.

17. The nozzle assembly having a side loading nozzle of claim 1, wherein said nozzle assembly comprises a weight.

18. The nozzle assembly having a side loading nozzle of claim 1 wherein said nozzle body comprises a seal carrier and a nozzle seal, wherein said seal carrier retains said nozzle seal in said nozzle body fluid passage between said nozzle body and said nozzle insert, wherein said nozzle seal comprises a concave shape, wherein said nozzle seal comprises at least one positioning tab wherein said at least one positioning tab is positioned within a locating groove of said nozzle body to locate said nozzle seal in a correct position when said nozzle seal is positioned within said nozzle body.

19. The nozzle assembly having a side loading nozzle of claim 1, said nozzle body comprises a nozzle body magnet, wherein said nozzle insert comprises a nozzle insert magnet, wherein said nozzle body magnet and said nozzle insert magnet are configured for attractive force between said nozzle body magnet and said nozzle insert magnet, wherein said attractive force is configured to bias said detents into said detent notches to retain said nozzle insert in each of said operating positions.

20. The nozzle assembly having a side loading nozzle of claim 19, wherein said detent notches each comprises a sloped surface configured for allowing sliding movement of said tabs into and out of said detent depressions when said nozzle insert is rotated between operating positions.

* * * * *